United States Patent [19]

Fleming, III

[11] Patent Number: 5,745,053

[45] Date of Patent: Apr. 28, 1998

[54] LANDING GEAR WARNING APPARATUS AND METHOD FOR PILOTS APPROACHING A RUNWAY WITH RETRACTED LANDING GEAR

[76] Inventor: Hoyt A. Fleming, III, 4134 W. Quail Ridge Dr., Boise, Id. 83703

[21] Appl. No.: 570,917

[22] Filed: Dec. 8, 1995

[51] Int. Cl.[6] .................................................. G08B 23/00
[52] U.S. Cl. .................. 340/970; 340/963; 364/424.013
[58] Field of Search .................................. 340/970, 960, 340/963, 968, 961; 364/424.012, 428, 424.06, 461, 424.03; 73/178 T; 244/102 R

[56] References Cited

U.S. PATENT DOCUMENTS

| | | |
|---|---|---|
| 3,815,262 | 6/1974 | Patterson et al. |
| 3,936,796 | 2/1976 | Bateman . |
| 3,946,358 | 3/1976 | Bateman . |
| 3,947,810 | 3/1976 | Bateman et al. |
| 3,988,713 | 10/1976 | Bateman . |
| 4,030,065 | 6/1977 | Bateman . |
| 4,034,334 | 7/1977 | Allyn . |
| 4,040,581 | 8/1977 | Schlanert et al. ............... 244/83 |
| 4,078,317 | 3/1978 | Wheatley et al. . |
| 4,224,669 | 9/1980 | Brame ........................ 340/970 |
| 4,319,218 | 3/1982 | Bateman . |
| 4,433,323 | 2/1984 | Grove ........................ 340/970 |
| 4,495,483 | 1/1985 | Bateman ...................... 340/970 |
| 4,516,124 | 5/1985 | Shannon et al. ................ 340/960 |
| 4,567,483 | 1/1986 | Bateman et al. ................ 340/970 |
| 4,646,244 | 2/1987 | Bateman et al. ................ 340/963 |
| 4,675,823 | 6/1987 | Noland ....................... 340/963 |
| 4,792,799 | 12/1988 | Grove ........................ 340/970 |
| 4,818,992 | 4/1989 | Paterson ...................... 340/970 |
| 4,849,756 | 7/1989 | Bateman ...................... 340/970 |
| 4,914,436 | 4/1990 | Bateman et al. ................ 340/963 |
| 4,916,447 | 4/1990 | Vermillion et al. .............. 340/970 |
| 4,939,513 | 7/1990 | Paterson et al. ................ 340/970 |
| 4,951,047 | 8/1990 | Paterson et al. ................ 340/970 |
| 4,980,684 | 12/1990 | Paterson et al. ................ 340/970 |
| 4,987,413 | 1/1991 | Grove ........................ 340/970 |
| 5,001,476 | 3/1991 | Vermillion et al. .............. 340/970 |
| 5,038,141 | 8/1991 | Grove ........................ 340/970 |
| 5,075,685 | 12/1991 | Vermillion et al. .............. 340/970 |
| 5,136,518 | 8/1992 | Glover ....................... 364/433 |
| 5,187,478 | 2/1993 | Grove ........................ 340/970 |
| 5,414,631 | 5/1995 | Denoize et al. ................ 340/963 |
| 5,428,354 | 6/1995 | Torget ....................... 340/963 |
| 5,488,563 | 1/1996 | Chazelle et al. ................ 340/970 |

*Primary Examiner*—Brent A. Swarthout

[57] ABSTRACT

A landing gear warning system for an aircraft with at least one retractable landing gear member comprising: (a) a landing gear indicator adapted for generating a signal representative of the position of the landing gear member; (b) an aircraft positioning system adapted for generating a signal representative of the aircraft's latitude, longitude, and elevation; (c) a pilot warning device; and (d) a computer system operatively coupled to the landing gear indicator, the aircraft positioning system, and the pilot warning device, wherein the computer system includes a database that contains the longitude and latitude, and elevation of a plurality of runways, and wherein the computer system is adapted for receiving the signal representative of the aircraft's latitude, longitude, and elevation, adapted for receiving the signal representative of the position of the landing gear member, and adapted for generating a pilot warning signal that activates the pilot warning device if the aircraft's elevation is less than a predetermined value above the elevation of the closest runway in the database to the aircraft and the signal representative of the position of the landing gear member indicates that the retractable landing gear member is retracted.

13 Claims, 2 Drawing Sheets

5,745,053

LANDING GEAR WARNING APPARATUS AND METHOD FOR PILOTS APPROACHING A RUNWAY WITH RETRACTED LANDING GEAR

BACKGROUND OF THE INVENTION

This invention relates to a system that warns pilots of retractable landing gear aircraft that they are near to and/or approaching a runway with their landing gear retracted.

One concern that many pilots have is landing on a runway with their landing gear retracted. During the landing phase, pilots can be distracted and sometimes forget to lower their landing gear. Thus, a need exists for a simple and economical system that will warn pilots to extend their landing gear when they approach runways.

SUMMARY OF THE INVENTION

The invention relates to a landing gear warning system for an aircraft with at least one retractable landing gear member. The landing gear warning system comprises: (a) a landing gear indicator adapted for generating a signal representative of the position of the landing gear member; (b) an aircraft positioning system adapted for generating a signal representative of the aircraft's latitude, longitude, and elevation; (c) a pilot warning device; and (d) a computer system operatively coupled to the landing gear indicator, the aircraft positioning system, and the pilot warning device, wherein the computer system includes a database that contains the longitude and latitude, and elevation of a plurality of runways, and wherein the computer system is adapted for receiving the signal representative of the aircraft's latitude, longitude, and elevation, adapted for receiving the signal representative of the position of the landing gear member, and adapted for generating a pilot warning signal that activates the pilot warning device if the aircraft's elevation is less than a predetermined value above the elevation of the closest runway in the database to the aircraft and the signal representative of the position of the landing gear member indicates that the retractable landing gear member is retracted.

DETAILED DESCRIPTION OF SPECIFIC EMBODIMENTS

Figure 1:
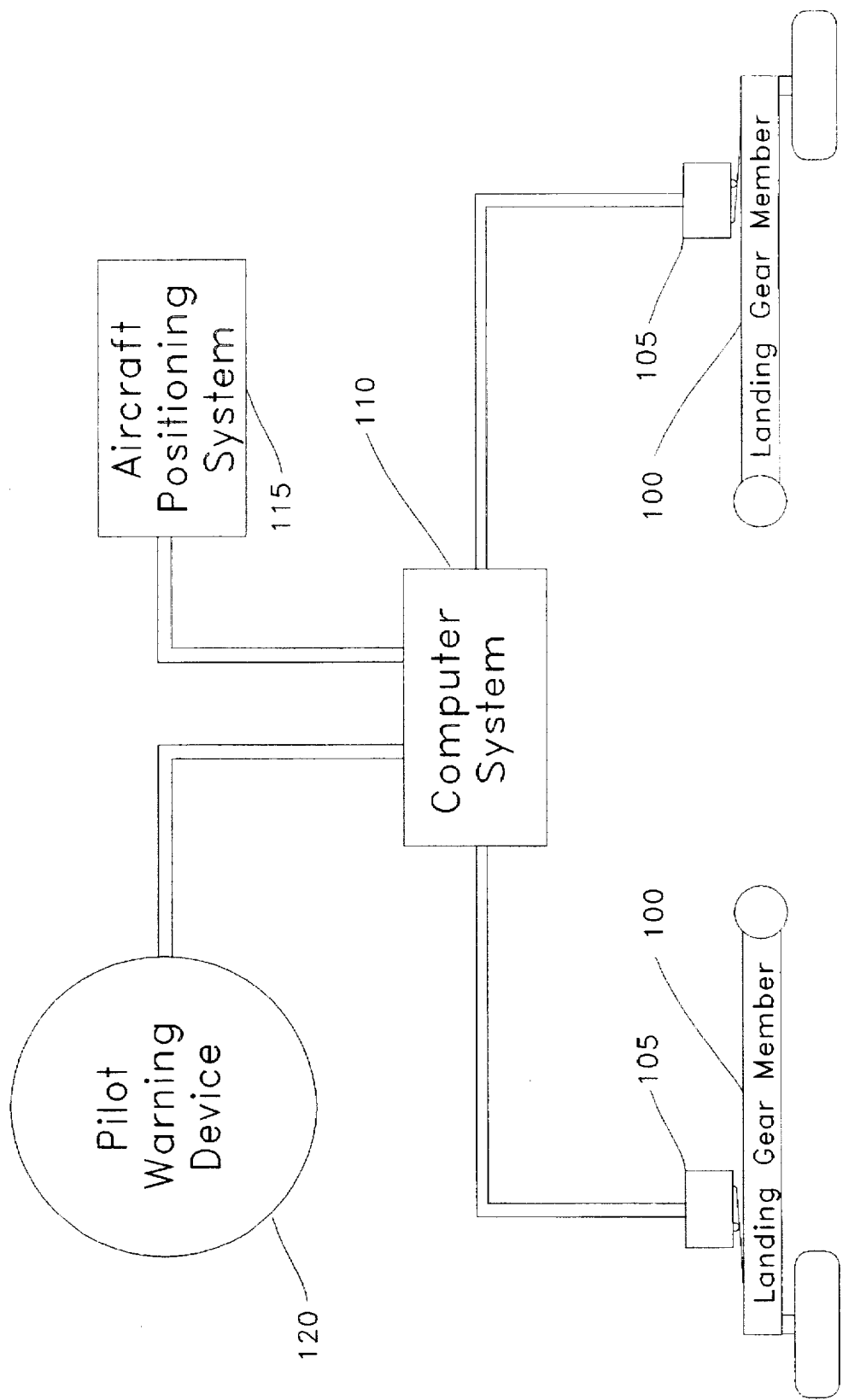
FIG. 1 is a block diagram of one embodiment of the invention.

Referring to FIG. 1, the landing gear warning system is designed to be installed in an aircraft with at least one retractable landing gear member 100.

Landing Gear Indicator

At least one landing gear indicator 105 is operatively coupled to at least one retractable landing gear member 100. Alternatively, the landing gear indicator 105 may be operatively coupled to a landing gear door or the like. The landing gear indicator 105 is conventional. A popular landing gear indicator is a MIL-S-25253-1 limit switch.

Computer System

A computer system 110 is conventionally coupled to at least one landing gear indicator 105. The computer system 110 is conventional. One embodiment of the computer system 110 contains a RS232 or a RS422 serial port. The programming of the computer system 110 is also conventional. The computer program may be stored on a diskdrive, a ROM, or any other conventional program storage device. The computer system 110 may be a computer system such as those used in conventional GPS receivers. Alternatively, the computer system 110 could be an Intel or Motorola based microprocessor system. The computer system 110 may contain (or may be operatively coupled to) a database. This database contains the position and elevation of a plurality of airport runways. The position of the runways may be stored in conventional latitude and longitude coordinates or in a compressed format representative of the same. The elevation of the runways may be stored as feet above sea-level. Such databases are included with many modern GPS receivers.

Aircraft Positioning System

The computer system 110 is operatively coupled to an aircraft positioning system 115. The aircraft positioning system 115 calculates the aircraft's position and elevation. An aircraft positioning system 115 may be a GPS receiver, a LORAN receiver, an inertial navigation device or the like. Many GPS receivers output the aircraft's position and location via a conventional RS232 or RS422 port. These GPS receivers can be conventionally coupled to the computer system 110. Alternatively, the computer system 110 may be a part of the aircraft positioning system 115.

Warning Pilots of an Unsafe Condition

Figure 2:
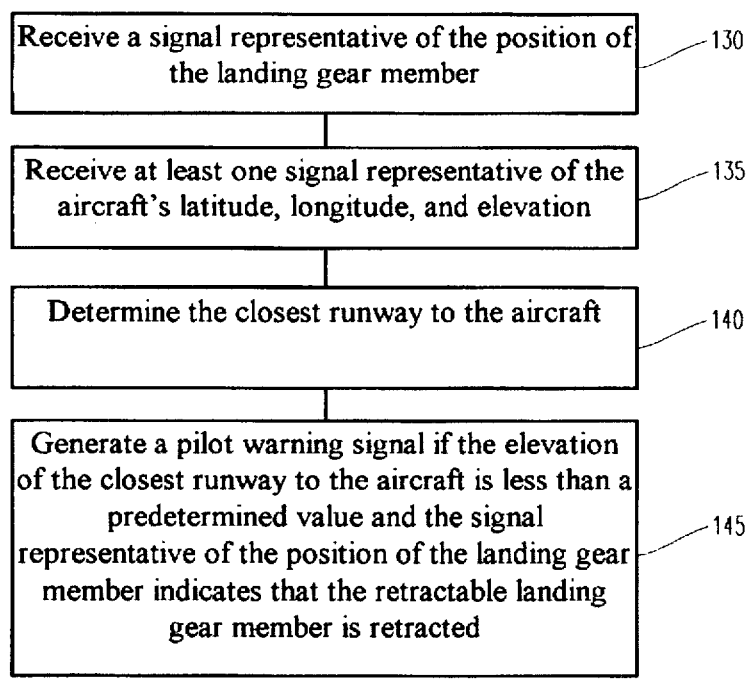
FIG. 2 is a flow diagram of one embodiment of the invention.

Referring to FIG. 2, the computer system 110 may receive one or more signals representative of the position of the landing gear members 100, 130. The computer system 110 may also receive at least one signal representative of the aircraft's latitude, longitude, and elevation 135. Using conventional methods that are well known in the art, the computer system 110 may determine the closest runway in the database to the aircraft 140. Next, the computer system 110 may generate a pilot warning signal that activates the pilot warning device if the aircraft's elevation is less than a predetermined value, such as 500 feet, above the elevation of the closest runway in the database to the aircraft and the signal representative of the position of the landing gear member 100 indicates that the retractable landing gear member is retracted 145.

Alternatively, if the aircraft's height above the ground is decreasing, the computer system 110 may conventionally calculate the estimated time that the aircraft will descend to the elevation of the closest runway if the aircraft continues descending at a constant rate. If the estimated time is less than a predetermined time, such as 1 minute, then the computer system 110 may activate the pilot warning device 120.

In an effort to reduce false alarms, the warning device 120 may be activated only if the aircraft is within a predetermined distance, such as 10 miles, from a runway.

Pilot Warning Device

The pilot warning device 120 may present a visual warning and/or an acoustical warning. If a visual warning is desired, then any light emitting device such as a lightbulb, a light emitting diode (LED), an electroluminescent device, and/or a display on an aircraft positioning device may be used. If an acoustical warning is desired, then any sound producing device such as a buzzer, a horn, a chime, or a conventional voice chip with a prerecorded message may be used.

SOME ADVANTAGES OF THE INVENTION

An advantage of the invention is that it provides pilots with a warning that an unsafe condition is likely to exist. Specifically the invention provides pilots with a warning that they are close to or rapidly approaching a runway with at least one landing gear member retracted.

Another advantage of the invention is that it is economical. The manufacturer of conventional GPS receivers could include present invention in its GPS receivers for a very small incremental cost increase. The same computer system utilized to calculate the aircraft position and elevation from the GPS satellites could be used to receive the signal representative of the position of the landing gear members, determine the closest runway to the aircraft, determine if the aircraft is within a predetermined elevation of the closest runway, and generate a pilot warning signal. Further, the display in a GPS receiver could be used as a pilot warning device.

While the invention has been described in conjunction with specific embodiments thereof, it will be apparent to those of ordinary skill having the benefit of this disclosure that other modifications and changes therein in addition to the examples discussed above may be made by those skilled in the art without departing from the spirit and scope of the invention.

I claim:

1. A landing gear warning system for an aircraft with at least one retractable landing gear member comprising:
   (a) a landing gear indicator adapted for generating a signal representative of the position of the landing gear member;
   (b) an aircraft positioning system adapted for generating at least one signal representative of the aircraft's latitude, longitude, and elevation;
   (c) a pilot warning device; and
   (d) a computer system operatively coupled to the landing gear indicator, the aircraft positioning system, and the pilot warning device, wherein the computer system includes a database that contains the longitude and latitude, and elevation of a plurality of runways, and wherein the computer system is adapted for receiving the at least one signal representative of the aircraft's latitude, longitude, and elevation, adapted for receiving the signal representative of the position of the landing gear member, and adapted for generating a pilot warning signal that activates the pilot warning device if the aircraft's elevation is less than a predetermined value above the elevation of the closest runway in the database to the aircraft and the signal representative of the position of the landing gear member indicates that the retractable landing gear member is retracted.

2. The landing gear warning system of claim 1, wherein the aircraft positioning device utilizes satellites to measure the aircraft's position.

3. The landing gear warning system of claim 1, wherein the aircraft positioning device utilizes the Global Positioning System.

4. The landing gear warning system of claim 1, wherein the computer system generates the pilot warning signal only if the distance between the aircraft and the closest runway is less than a second predetermined value.

5. A landing gear warning system for an aircraft with at least one retractable landing gear member comprising:
   (a) a landing gear indicator adapted for generating a signal representative of the position of the landing gear member;
   (b) an aircraft positioning system adapted for generating at least one signal representative of the aircraft's latitude, longitude, and elevation;
   (c) a pilot warning device; and
   (d) a computer system operatively coupled to the landing gear indicator, the aircraft positioning system, and the pilot warning device, wherein the computer system includes a database that contains the longitude, latitude, and elevation of a plurality of runways, and wherein the computer system is adapted for receiving the at least one signal representative of the aircraft's latitude, longitude, and elevation, adapted for receiving the signal representative of the position of the landing gear member, and adapted for generating a pilot warning signal that activates the pilot warning device if the aircraft will descend to the elevation of the closest runway in the database in less than a predetermined time and the signal representative of the position of the landing gear member indicates that the retractable landing gear member is retracted.

6. The landing gear warning system of claim 5, wherein the aircraft positioning device utilizes satellites to measure the aircraft's position.

7. The landing gear warning system of claim 5, wherein the aircraft positioning device utilizes the Global Positioning System.

8. A landing gear warning system for an aircraft with at least one retractable landing gear member comprising:
   (a) a landing gear indicator adapted for generating a signal representative of the position of the landing gear member;
   (b) an aircraft positioning system adapted for determining the aircraft's latitude, longitude, and elevation, the aircraft positioning system having a computer system and a pilot warning device, the aircraft positioning system operatively coupled to the landing gear indicator, wherein the computer system includes a database that contains the longitude, latitude, and elevation of a plurality of runways, and wherein the aircraft positioning system is adapted for receiving the signal representative of the position of the landing gear member and is adapted for generating a pilot warning signal that activates the pilot warning device if the aircraft's elevation is less than a predetermined value above the elevation of the closest runway in the database to the aircraft and the signal representative of the position of the landing gear member indicates that the retractable landing gear member is retracted.

9. The landing gear warning system of claim 8, wherein the aircraft positioning device utilizes satellites to measure the aircraft's position.

10. The landing gear warning system of claim 8, wherein the aircraft positioning device utilizes the Global Positioning System.

11. The landing gear warning system of claim 8, wherein the aircraft positioning system displays the warning only if the distance between the aircraft and the closest runway is less than a second predetermined value.

12. A method of warning a pilot of an aircraft with at least one retractable landing gear member that an unsafe condition exists comprising the acts of:
   (a) receiving a signal representative of the position of the landing gear member;
   (b) receiving at least one signal representative of the aircraft's latitude, longitude, and elevation;
   (c) determining the closest runway to the aircraft;

(d) generating a pilot warning signal if the aircraft's elevation is less than a predetermined value above the elevation of the closest runway in the database to the aircraft and the signal representative of the position of the landing gear member indicates that the retractable landing gear member is retracted.

13. The method of claim 12, wherein the pilot warning signal is generated only if the distance between the aircraft and the closest runway is less than a second predetermined value.

* * * * *